(12) United States Patent
Shirakawa

(10) Patent No.: US 9,367,679 B2
(45) Date of Patent: Jun. 14, 2016

(54) INPUT INFORMATION AUTHENTICATION DEVICE, SERVER DEVICE, INPUT INFORMATION AUTHENTICATION SYSTEM, AND PROGRAM OF DEVICE

(71) Applicant: NEC Personal Computers, Ltd, Tokyo (JP)

(72) Inventor: Takahisa Shirakawa, Tokyo (JP)

(73) Assignee: NEC PERSONAL COMPUTERS, LTD, Tokyo (JP)

( * ) Notice: Subject to any disclaimer, the term of this patent is extended or adjusted under 35 U.S.C. 154(b) by 0 days.

(21) Appl. No.: 14/365,771

(22) PCT Filed: Oct. 18, 2012

(86) PCT No.: PCT/JP2012/076922
§ 371 (c)(1),
(2) Date: Jun. 16, 2014

(87) PCT Pub. No.: WO2013/088837
PCT Pub. Date: Jun. 20, 2013

(65) Prior Publication Data
US 2014/0359300 A1 Dec. 4, 2014

(30) Foreign Application Priority Data
Dec. 16, 2011 (JP) .................................. 2011-276099

(51) Int. Cl.
G06F 21/36 (2013.01)
H04L 29/06 (2006.01)

(52) U.S. Cl.
CPC .............. *G06F 21/36* (2013.01); *H04L 63/08* (2013.01)

(58) Field of Classification Search
None
See application file for complete search history.

(56) References Cited

U.S. PATENT DOCUMENTS

| 8,117,652 B1 * | 2/2012 | Lu .................................... 726/18 |
| 8,931,083 B2 * | 1/2015 | Griffin et al. .................... 726/19 |
| 2005/0010785 A1 * | 1/2005 | Abe et al. ....................... 713/182 |

(Continued)

FOREIGN PATENT DOCUMENTS

| JP | 2985888 B1 | 12/1999 |
| JP | 2009-169857 A | 7/2009 |
| JP | 2010-009543 A | 1/2010 |

OTHER PUBLICATIONS

Kitabayashi et al., Proposal on password authentication against iterative shoulder surfing. IEICE Technical Report, Jun. 2009, vol. 109, No. 115, pp. 21-26, ISEC2009-18, SITE2009-10, ICSS2009-32.

(Continued)

*Primary Examiner* — Hadi Armouche
*Assistant Examiner* — Malcolm Cribbs
(74) *Attorney, Agent, or Firm* — Nutter McClennen & Fish LLP; John J. Penny, Jr.

(57) ABSTRACT

At the time of input of authentication information, even when the hand and the input screen are seen from the third person, guess of authentication information is made difficult. A plurality of keys serving as input means are divided into a first region and a second region. Then, the first region and the second region are caused to transit between a first state and a second state distinguished from each other depending on the displayed contents. When a region where a key to be inputted for the input of authentication information is arranged is in the second state, input to the above-mentioned plurality of keys is recognized as dummy.

12 Claims, 9 Drawing Sheets

(56) References Cited

U.S. PATENT DOCUMENTS

| | | | |
|---|---|---|---|
| 2007/0198847 A1* | 8/2007 | Watari | 713/184 |
| 2008/0222048 A1* | 9/2008 | Higgins et al. | 705/67 |
| 2009/0037986 A1* | 2/2009 | Baker | 726/5 |
| 2011/0016220 A1* | 1/2011 | Desai et al. | 709/230 |
| 2012/0082306 A1* | 4/2012 | Hulse | 380/28 |
| 2012/0256723 A1* | 10/2012 | Grover | 340/5.8 |

OTHER PUBLICATIONS

International Search Report for Application No. PCT/JP2012/076922 mailed Jan. 8, 2013 (1 page).

* cited by examiner

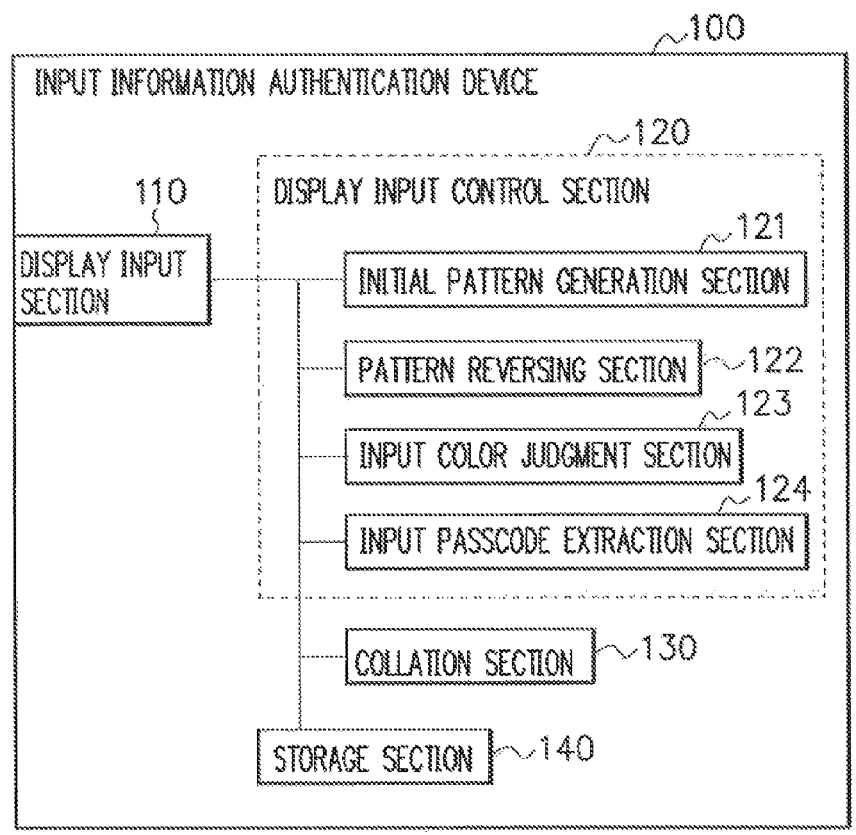

F I G. 3

F I G. 5
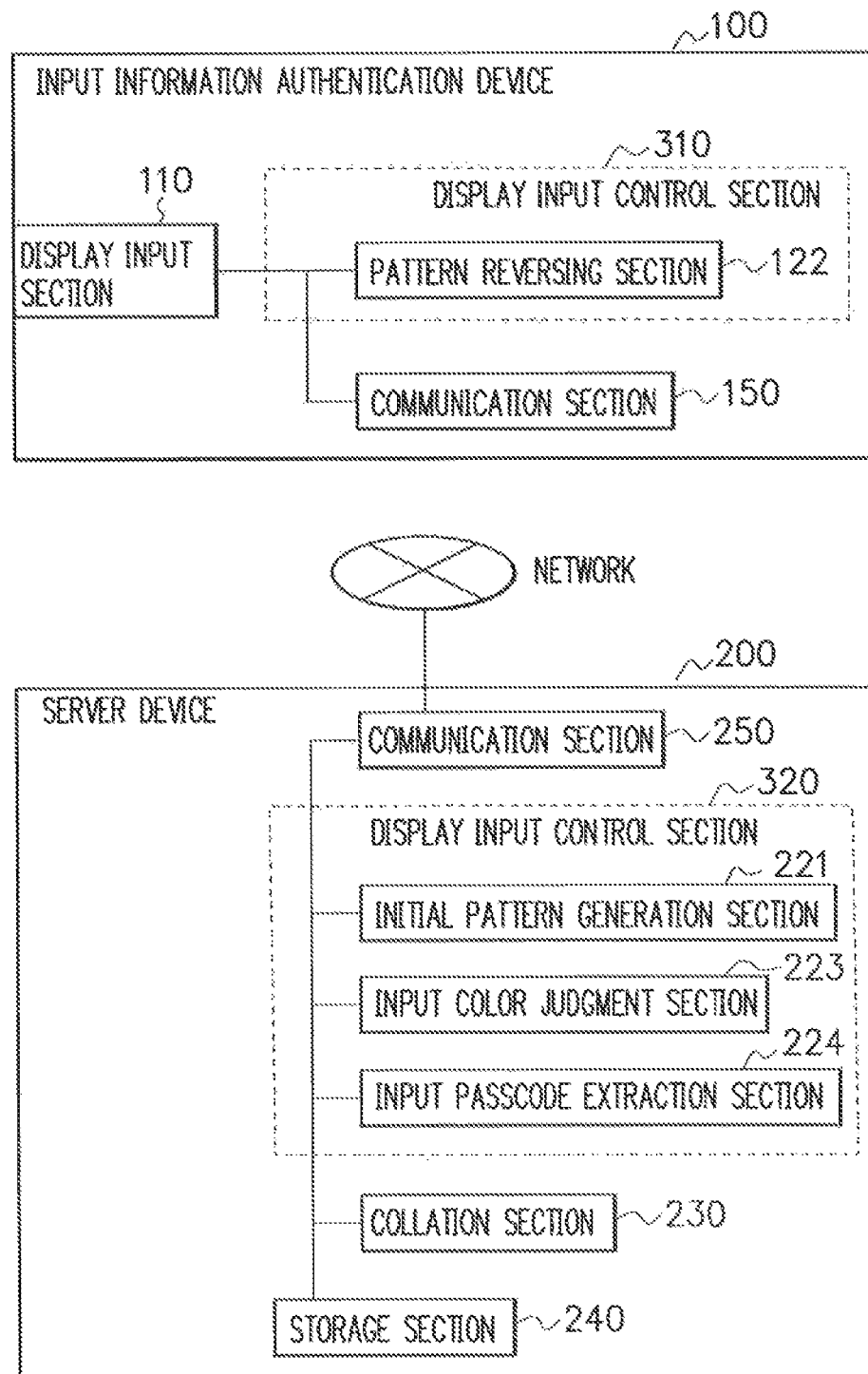

<COMBINATION OF INITIAL PATTERN AND INPUT COLOR>   <HASH CODE TO BE STORED>

1 ∗ 2 3 ∗ ∗
⬇ DECOMPOSE INTO EACH DIGIT 1 0 0 0 0 0         m d 5 ( 1 0 0 0 0 0 )
  2 0 0 0        m d 5 ( 2 0 0 0 )
   3 0 0         HASHING       m d 5 ( 3 0 0 )

CASE OF PASSCODE : 123

F I G. 11
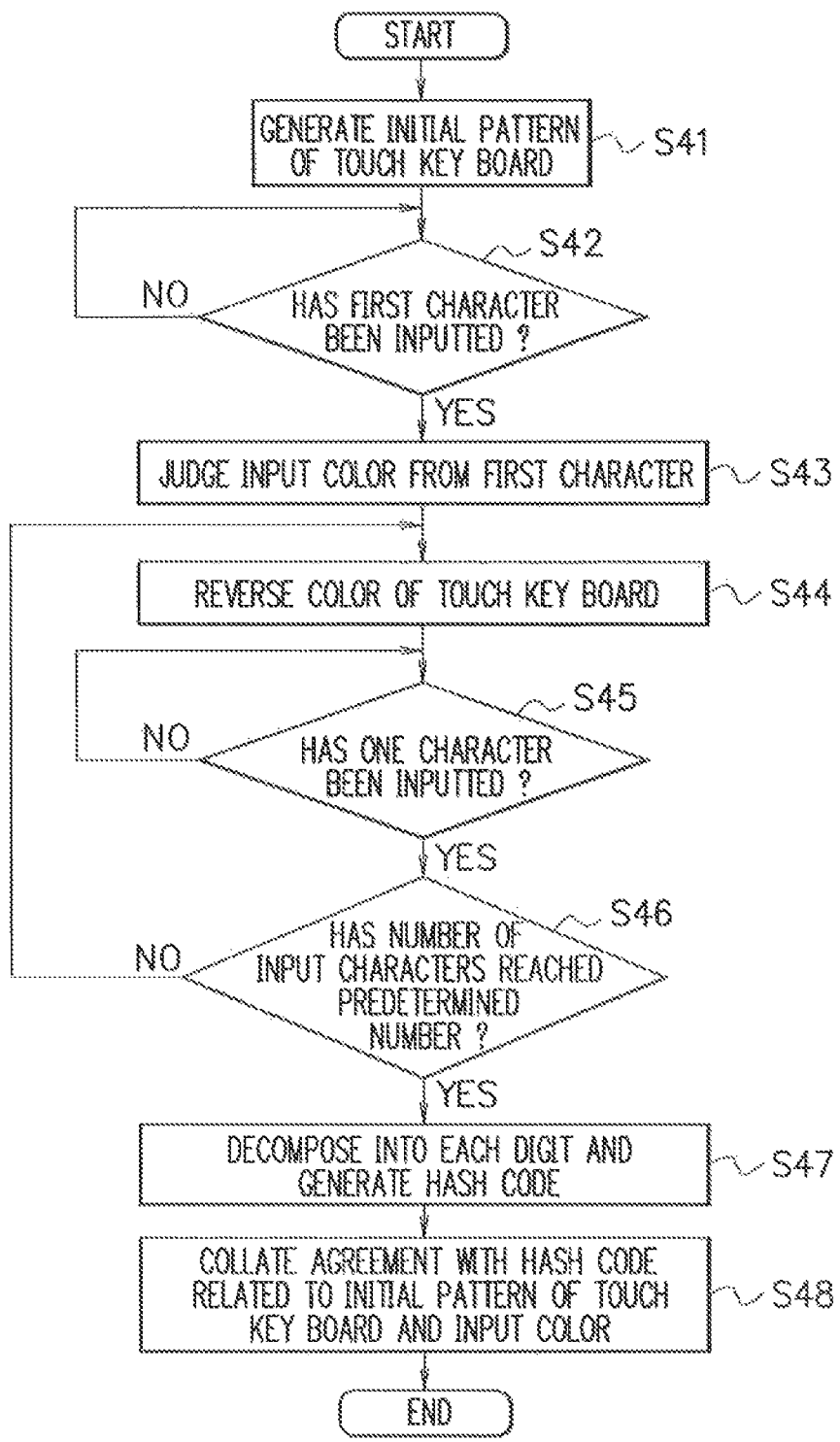

INPUT INFORMATION AUTHENTICATION DEVICE, SERVER DEVICE, INPUT INFORMATION AUTHENTICATION SYSTEM, AND PROGRAM OF DEVICE

TECHNICAL FIELD

The present invention relates to an input information authentication device, a server device, an input information authentication system, and a program of a device for receiving input of authentication information such as a PIN number, then performing collation between the input contents and the authentication information registered in advance, and then performing authentication which is judgment of agreement or disagreement.

BACKGROUND ART

As a technique of preventing authentication information from being peeped at the time of input, the viewing angle of the display screen is narrowed or alternatively inputted numeric characters are displayed with "*" marks or the like so that the number of inputted digits is solely shown.

Further, as a PIN number input device in which a user inputs a PIN number by using ten keys in a terminal of an automated teller machine (ATM) or the like, such a device is known in which an input ten-key screen and a fake input ten-key screen are displayed and then dummy digits are inserted into the PIN number so that even when the movement of the inputting hand is seen, the PIN number is prevented from being stolen (for example, see Patent Document 1).

PRIOR ART REFERENCE

Patent Document

PATENT DOCUMENT 1: Japanese Patent No. 2985888

SUMMARY OF THE INVENTION

Problems to be Solved by the Invention

Nevertheless, in the prior art for preventing the peeping described above in Patent Document 1 and the like, it is premised that the third person is located in a somewhat distant place like in a case of an automated teller machine (ATM) or the like. Thus, countermeasures against a case that the third person watches from a very close distance are not taken into consideration. That is, information instructing the user to input either a dummy number or a PIN number is presented to the fake input ten keys or the like. Thus, in a case that in addition to the movement of the hand of the user performing the input, the input screen itself is seen over the shoulder of the user performing the input or by using a hidden camera or the like, a possibility arises that which input is dummy is identified so that the PIN number is recognized.

The present invention has been devised in view of such situations. An object thereof is to provide an input information authentication device, a server device, an input information authentication system, and a program of a device in which at the time of input of authentication information, even when the hand and the input screen are seen from the third person, guess of authentication information can be made difficult.

Means for Solving to the Problems

For the purpose of achieving the object, the input information authentication device according to the present invention is characterized by an input information authentication device for performing authentication which is judgment of collation between information corresponding to operated keys of input means provided with a plurality of keys and authentication information stored in advance, wherein the plurality of keys are assigned to a first region and a second region, wherein the first region and the second region transit such that when one of the regions is in a first state, the other region goes into a second state which is not the first state, and wherein information corresponding to an operated key of the input means when a region where a key to be operated for performing input to be collated with the authentication information is arranged is in the first state is used in the authentication and information corresponding to the operated key of the input means when a region where the key to be operated for performing input to be collated with the authentication information is arranged is in the second state is not used in the authentication.

The server device according to the present invention is characterized by a server device used in a state of being connected to an input information authentication device by cable, by wireless, or by a combination of these, the server device including display input control means for controlling the input information authentication device, wherein the input information authentication device includes input means for performing key input and communication means for receiving the control from the display input control means, wherein the input means includes a plurality of keys, wherein the display input control means assigns the plurality of keys to any one of a first region and a second region, wherein the first region and the second region transit such that when one of the regions is in a first state, the other region goes into a second state which is not the first state, and wherein the display input control means uses, in authentication, information corresponding to an operated key of the input means when a region where a key to be operated for performing input to be collated with authentication information is arranged is in the first state, and does not use, in authentication, information corresponding to the operated key of the input means when a region where the key to be operated for performing input to be collated with the authentication information is arranged is in the second state.

The input information authentication system according to the present invention is characterized by an input information authentication system constructed such that an input information authentication device and a server device are connected to each other by cable, by wireless, or by a combination of these, wherein the server device includes display input control means for controlling the input information authentication device, wherein the input information authentication device includes input means for performing key input and communication means for receiving the control from the display input control means, wherein the input means includes a plurality of keys, wherein the display input control means assigns the plurality of keys to any one of a first region and a second region, wherein the first region and the second region transit such that when one of the regions is in a first state, the other region goes into a second state which is not the first state, and wherein information corresponding to an operated key of the input means when a region where a key to be operated for performing input to be collated with authentication information is arranged is in the first state is used in the authentication and information corresponding to the operated key of the input means when a region where the key to be operated for performing input to be collated with the authentication information is arranged is in the second state is not used in the authentication.

Further, the program of an input information authentication device according to the present invention is characterized by a program of an input information authentication device for performing authentication which is judgment of collation between information corresponding to operated keys of input means provided with a plurality of keys and authentication information stored in advance, causing a computer to execute:

a procedure of assigning the plurality of keys to any one of a first region and a second region;

a procedure of causing the first region and the second region to transit such that when one of the regions is in a first state, the other region go into a second state not equal to the first state; and a procedure of using, in the authentication, information corresponding to an operated key of the input means when a region where a key to be operated for performing input to be collated with the authentication information is arranged is in the first state and not using in the authentication, information corresponding to the operated key of the input means when a region where the key to be operated for performing input to be collated with the authentication information is arranged is in the second state.

Advantageous Effects of the Invention

As described above, according to the present invention, at the time of input of authentication information, even when the hand and the input screen are seen from the third person, guess of authentication information can be made difficult.

BRIEF DESCRIPTION OF THE DRAWINGS

FIG. 1 is a block diagram showing an exemplary configuration of an input information authentication device 100 serving as a first embodiment of the present invention.

FIG. 2 is a diagram showing an example of a touch key board and an example of an input code string in a case of passcode authentication OK.

FIG. 3 is a diagram describing an example of change of an initial pattern and security against a replay attack.

FIG. 5 is a block diagram showing an exemplary configuration of an input information authentication system serving as a second embodiment.

FIG. 11 is a flow chart showing an example of operation of an input information authentication device 100 serving as a third embodiment.

DESCRIPTION OF THE EMBODIMENTS

Figure 4:
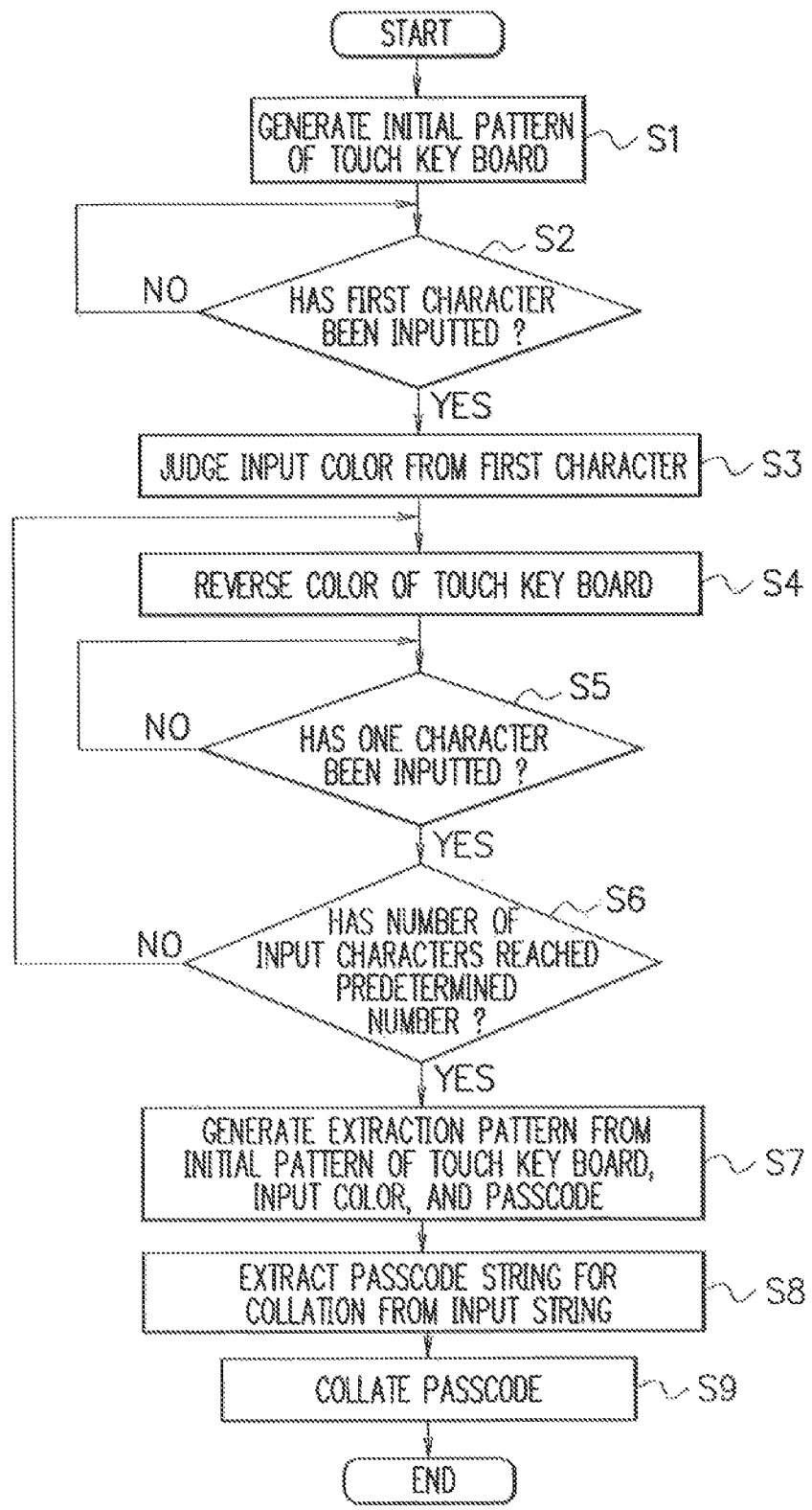
FIG. 4 is a flow chart showing an example of operation of an input information authentication device 100 serving as a first embodiment.

Next, an embodiment applied to an input information authentication device, a server device, an input information authentication system, and a program of a device according to the present invention is described below in detail with reference to the drawings.

First, outlines common to the individual embodiments of the present invention are described below.

In the embodiments of the present invention, input keys are divided into two regions by using display colors. Then, in the course of inputting a passcode achieving authentication OK, depending on the situation that the key to be operated next is assigned to which region, the key input is distinctively recognized as an input passcode used in authentication or as a dummy code not used in authentication.

As such, in the embodiments of the present invention, whether the input is to be recognized as a dummy input or as authentication information is not determined depending on the region where the inputted key having belonged. Thus, a situation can be realized that which input is dummy cannot be identified by the third person who does not know the authentication information. Thus, even when the hand and the display screen at the time of input are seen from the third person, guess of authentication information can be made difficult.

[First Embodiment]

Next, a first embodiment of the present invention is described below.

Each embodiment described below is described for an example that a passcode consisting of numeric characters is used as authentication information.

As shown in FIG. 1, the input information authentication device 100 serving as the first embodiment includes: a display input section 110 such as a touch panel display; a display input control section 120 a collation section 130 for performing collation of the inputted passcode; and a storage section 140 for storing a registered passcode and the like.

The display input section 110 displays a plurality of keys onto a screen, then detects the position of contact to the front surface screen, and then on the basis of the position information concerning the contact position, determines that the input has been performed onto which one of the plurality of displayed keys.

The display input control section 120 performs display control of the input keys displayed on the display input section 110 and performs control such as extraction of an input passcode from the input information.

The display input control section 120 includes: an initial pattern generation section 121 for generating an initial pattern in the display of the input keys; a pattern reversing section 122 for reversing the display pattern of the input keys; an input color judgment section 123 for judging an input color serving as the color of keys that can contain the input passcode inputted by a user, and an input passcode extraction section 124 for extracting the inputted passcode.

The input information authentication device 100 of the present embodiment having such a configuration displays a touch key board composed of a plurality of keys for numeric character input onto the display input section 110 and then receives input of a passcode by the user.

FIG. 2 shows an example of screen display in the display input section 110 and an example of an input code string in a case of passcode authentication OK.

Each embodiment of the present invention is described for an example that numeric characters 1 to 9 for numeric character input are assigned to the input keys displayed on the display input section 110. Further, the example of FIG. 2 shows a case that the passcode is "123".

As shown in FIG. 2, the input keys are divided into colored keys and white keys. Then, any one group serves as a key color that can contain the input passcode inputted by the user and is treated as a key color recognized as a recognition object. Further, the other serves as a key color indicating not being a recognition object as an input passcode. That is, keys of the key color judged as the input color by the input color judgment section 123 are recognized as keys that can contain the input passcode and treated as recognition objects. Further, keys of the key color judged as not being the input color are recognized as keys that cannot contain the input passcode and treated as not being recognition objects.

Further, in the region division for the keys by using the display of colored keys and white keys, an initial pattern is displayed first and then the pattern is reversed at each time that one character is inputted. That is, at each time that one character is inputted, the portion of colored keys becomes white keys and the portion of white keys becomes colored keys. Then, this operation is repeated.

As an input rule to be presented to the user, in the course of inputting the passcode achieving authentication OK, when the key to be operated next has the key color of recognition object, the passcode is not authenticated unless this key is inputted.

Thus, the beginning first character in the inputting of the passcode need indispensably be inputted at any one of the first time and the second time. Then, the key color at the time that the beginning first character is inputted is judged as the input color indicating recognition objects by the input color judgment section 123.

Further, in the course of inputting the passcode achieving authentication OK, when the key to be operated next has a color not being the input color, regardless of whichever input key, the input is treated as a dummy code.

As an input rule to be presented to the user, it is preferable that keys of the same color alone are to be inputted. Then, recognition of which key inputs are dummy can be made difficult.

Further, at the time of input of the passcode, a dummy code in the number of digits equal to the number of digits of the passcode are to be mixed in and inputted. The example of FIG. 2 shows an example that the passcode is a number having three digits and then a number having a total of six digits including a dummy code of three digits is to be inputted.

As an input rule to be presented to the user, even when inputting of the passcode has been completed, the processing does not go to the collation of the passcode until any input is performed up to a predetermined number of digits (six digits in the example of FIG. 2) including a dummy code. Thus, after the inputting of the passcode has been completed, all inputs up to the predetermined number of digits (six digits in the example of FIG. 2) including a dummy code is treated as dummy inputs.

Next, an example of operation in a case that the passcode achieves authentication OK in the present embodiment is described below with reference to detailed examples of FIGS. 2(a) and 2(b).

FIG. 2(a) shows an example that "1, 2, 6, 7, 9" are displayed as colored keys in the initial pattern and that "1" which is the first one character of the passcode "1, 2, 3" has been inputted in the input of the first character. Thus, the input color judgment section 123 judges that the colored keys are the keys of input color indicating recognition objects. Then, the input passcode extraction section 124 recognizes the input of the first character as the first digit of the input passcode inputted by the user.

At the time of input of the second character, display of the colored keys and the white keys are reversed. Thus, "2" which is the key to be operated next in the passcode "1, 2, 3" is expressed as a white key, that is, treated as not being a recognition object. Thus, the input of the second character is treated as a dummy input regardless of the input to whichever key. In the example of FIG. 2, "*" indicates dummy input.

At the time of input of the third character, display of the colored keys and the white keys are reversed. Thus, "2" which is the key to be operated next in the passcode "1, 2, 3" is expressed as a colored key, that is, treated as a recognition object. Thus, the input passcode extraction section 124 recognizes the input of the third character as the second digit of the input passcode inputted by the user. In order to acquire authentication OK, the user is to input "2" in the input of the third character.

At the time of input of the fourth character, display of the colored keys and the white keys are reversed. Thus, "3" which is the key to be operated next in the passcode "1, 2, 3" is expressed as a colored key, that is, treated as a recognition object. Thus, the input passcode extraction section 124 recognizes the input of the fourth character as the third digit of the input passcode inputted by the user. In order to acquire authentication OK, the user is to input "3" in the input of the fourth character.

At the time of input of the fifth character and the sixth character, input of all three digits of the input passcode to be inputted by the user has been completed. Thus, input of any keys is dummy input. As such, passcode input is completed.

FIG. 2(b) shows an example that, in a state that "1, 2, 6, 7, 9" are displayed as colored keys in the initial pattern, "1" which is the first one character of the passcode "1, 2, 3" is not inputted in the input of the first character. That is, "*" which is the input of the first character indicates that one character other than "1" which is the first one character of the passcode "1, 2, 3" has been inputted as dummy. Thus, the input color judgment section 123 judges that the white keys are the keys of input color indicating recognition objects.

At the time of input of the second character, display of the colored keys and the white keys are reversed. Thus, "1" which is the key to be operated as the beginning first character in the passcode "1, 2, 3" is expressed as a white key, that is, treated as a recognition object. Thus, the input passcode extraction section 124 recognizes the input of the second character as the first digit of the input passcode inputted by the user. In order to acquire authentication OK, the user is to input "1" in the input of the second character.

At the time of input of the third character, display of the colored keys and the white keys are reversed. Thus, "2" which is the key to be operated next in the passcode "1, 2, 3" is expressed as a colored key, that is, treated as not being a recognition object. Thus, the input of the third character is treated as a dummy input regardless of the input to whichever key. In the example of FIG. 2, "*" indicates dummy input.

At the time of input of the fourth character, display of the colored keys and the white keys are reversed. Thus, "2" which is the key to be operated next in the passcode "1, 2, 3" is expressed as a white key, that is, treated as a recognition object. Thus, the input passcode extraction section 124 recognizes the input of the fourth character as the second digit of the input passcode inputted by the user. In order to acquire authentication OK, the user is to input "2" in the input of the fourth character.

At the time of input of the fifth character, display of the colored keys and the white keys are reversed. Thus, "3" which is the key to be operated next in the passcode "1, 2, 3" is expressed as a white key, that is, treated as a recognition object. Thus, the input passcode extraction section 124 recognizes the input of the fifth character as the third digit of the input passcode inputted by the user. In order to acquire authentication OK, the user is to input "3" in the input of the fifth character.

At the time of input of the sixth character, input of all three digits of the input passcode to be inputted by the user has been completed. Thus, input of any keys is dummy input. As such, passcode input is completed.

Next, security against a replay attack in the input information authentication device 100 of the present embodiment is described below with reference to a detailed example of FIG. 3.

FIG. 3(a) shows an example that, similarly to the case of FIG. 2(a), "1, 2, 6, 7, 9" are displayed as colored keys in the initial pattern and then "1" which is the first one character of the passcode "1, 2, 3" has been inputted in the input of the first character. Thus, the example of FIG. 3(a) shows a case that the second character, the fifth character, and the sixth character are dummy inputs and then six digits of "1, 5, 2, 3, 6, 4" including the dummy inputs have been inputted.

Here, as shown in FIG. 3(a), it is assumed that during the time that the user inputs the passcode, the movement of the hand performing the key input and the input screen have been seen by the third person from a very close distance like over the shoulder of the user. Further, it is assumed that after that, the input information authentication device 100 of the present embodiment has been acquired by the third person.

Then, FIG. 3(b) shows an example that the third person has inputted the same six digits of "1, 5, 2, 3, 6, 4" obtained by peeping into the input information authentication device 100 of the present embodiment.

The initial pattern is determined at random. Thus, at the time of input in FIG. 3(b), display is performed in an initial pattern different from that at the time of input in FIG. 3(a) described above. FIG. 3(b) shows an example that "2, 3, 5, 7" are displayed as colored keys as an example of the initial pattern.

In a state that this initial pattern is displayed, when the third person who has acquired the input information authentication device 100 inputs the same six digits of "1, 5, 2, 3, 6, 4" as those having been peeped previously, "1" which is the first one character of the passcode "1, 2, 3" is first inputted as the first character. Thus, the input color judgment section 123 judges that the white keys are the keys of input color indicating recognition objects. Further, the input passcode extraction section 124 recognizes "1" which is the input key for the first character as the first digit of the input passcode inputted by the user.

At the time of input of the second character, display of the colored keys and the white keys are reversed. Thus, "2" which is the key to be operated next in the passcode "1, 2, 3" is expressed as a white key, that is, treated as a recognition object. Thus, the input passcode extraction section 124 recognizes "5" which is the input key for the second character as the second digit of the input passcode inputted by the user.

At the time of input of the third character, display of the colored keys and the white keys are reversed. Thus, "3" which is the key to be operated next in the passcode "1, 2, 3" is expressed as a colored key, that is, treated as not being a recognition object. Thus, "2" which is the input of the third character is treated as a dummy input.

At the time of input of the fourth character, display of the colored keys and the white keys are reversed. Thus, "3" which is the key to be operated next in the passcode "1, 2, 3" is expressed as a white key, that is, treated as a recognition object. Thus, the input passcode extraction section 124 recognizes "3" which is the input key for the fourth character as the third digit of the input passcode inputted by the user.

At the time of input of the fifth character and the sixth character, input up to the third digit of the input passcode to be inputted by the user has been completed. Thus, "6" which is the input of the fifth character and "4" which is the input of the sixth character are treated as dummy inputs.

As such, the input passcode extraction section 124 recognizes that the inputted passcode is "1, 5, 3". This does not agree with the correct passcode "1, 2, 3" and hence the authentication result is concluded as NG.

Thus, even when the third person who has peeped the passcode input acquires the input information authentication device 100 and then inputs the same six digits as those having been peeped previously, the input contents obtained by peeping cannot achieve authentication OK. As such, high security is realized that even when the movement of the hand performing the key input and the input screen are seen, the correct passcode cannot be known.

Further, a configuration may be employed that when passcode authentication is once concluded as NO, the wait time for the input is doubled at the next time of passcode input. As such, since the wait time is doubled at each time that passcode authentication is concluded as NQO security against repeated replay attacks is improved. Further, a configuration may be employed that the wait time is elongated exponentially at each time that passcode authentication is concluded as NG.

An example of input in a case that passcode authentication OK is to be achieved after authentication NG has been concluded as shown in FIG. 3(b) is described below with reference to FIG. 3(c).

When NG has been concluded in passcode authentication, the same initial pattern is displayed at the next time of passcode input. Thus, the probability that the same initial pattern as that (the initial pattern of FIG. 3(a)) of the time that the third person peeped the passcode is displayed can be made zero. That is, the probability that the initial pattern determined at random agrees with the initial pattern of FIG. 3(a) by coincidence can be made zero.

Here, when the input of the first character is "1", "1" which is the first one character of the passcode "1, 2, 3" has been inputted in the input of the first character. Thus, the input color judgment section 123 judges that the white keys are the keys of input color indicating recognition objects. Further, the input passcode extraction section 124 recognizes the input of the first character as the first digit of the input passcode inputted by the user.

At the time of input of the second character, display of the colored keys and the white keys are reversed. Thus, "2" which is the key to be operated next in the passcode "1, 2, 3" is expressed as a white key, that is, treated as a recognition object. Thus, the input passcode extraction section 124 recognizes the input of the second character as the second digit of the input passcode inputted by the user. In order to acquire authentication OK, the user is to input "2" in the input of the second character.

At the time of input of the third character, display of the colored keys and the white keys are reversed. Thus, "3" which is the key to be operated next in the passcode "1, 2, 3" is expressed as a colored key, that is, treated as not being a recognition object. Thus, the input of the third character is treated as a dummy input regardless of the input to whichever key. In the example of FIG. 3, "*" indicates dummy input.

At the time of input of the fourth character, display of the colored keys and the white keys are reversed. Thus, "3" which is the key to be operated next in the passcode "1, 2, 3" is expressed as a white key, that is, treated as a recognition object. Thus, the input passcode extraction section 124 recognizes the input of the fourth character as the third digit of the input passcode inputted by the user. In order to acquire authentication OK, the user is to input "3" in the input of the fourth character.

At the time of input of the fifth character and the sixth character, input of all three digits of the input passcode to be inputted by the user has been completed. Thus, input of any keys is dummy input. As such, passcode input is completed.

Next, an example of operation of the input information authentication device 100 serving as the first embodiment is described below with reference to the flow chart of FIG. 4.

First, the initial pattern generation section 121 generates an initial pattern of the touch key board to be displayed on the touch panel display serving as the display input section 110 (step S1).

The color of each key constituting the touch key board is any one of the two colors defined in advance. Then, the initial pattern of such key colors is set up at random. The method of setting up at random may be a method of diverse kind such as a known method employing random numbers.

When the touch key board is displayed in the initial pattern on the display input section 110 and then the first character is inputted to the touch key board (step S2), on the basis of the input contents of the first character, the input color judgment section 123 judges the input color to be recognized as a recognition object (step S3).

In the judgment at step S3, when the input key of the first character is the first digit of the registered passcode which is the key to be operated as the passcode input for achieving authentication OK, the input color judgment section 123 judges that the key color of the input key of the first character is the input color. When the input key of the first character is not the first digit of the registered passcode, the input color judgment section 123 judges that the key color different from the key color of the input key of the first character is the input color.

As such, when the first character has been inputted, for the purpose of the next key input, the pattern reversing section 122 generates a display pattern obtained by reversing the initial pattern. Then, the touch key board is displayed in the reversed pattern on the display input section 110 (step S4).

When next key input is performed in the touch key board displayed in the reversed pattern (step S5), the operation of steps S4 and S5 is repeated until the number of input characters reaches the predetermined number (step S6). That is, the pattern reversing section 122 repeats the operation of generating a display pattern obtained by reversing the display pattern used in the previous key input and then of receiving next key input.

As such, when the predetermined number of digits, that is, the twice number of digits obtained when the number of digits in the passcode is added with the same number of digits for a dummy code are inputted, on the basis of the initial pattern generated at step S1, the input color judged at step S3, and the passcode, the input passcode extraction section 124 distinguishes between the dummy code and the input passcode inputted by the user and then generates an extraction pattern for extracting the input passcode inputted by the user from the contents of the six digits of key input (step S7).

In the example of FIG. 2(a) described above, for the six digits of key input, the extraction pattern is "first digit, dummy, second digit, third digit, dummy, dummy" of the input passcode inputted by the user.

Further, in the example of FIG. 2(b) described above, for the six digits of key input, the pattern is "dummy, first digit, dummy, second digit, third digit, dummy" of the input passcode inputted by the user.

Further, in the example of FIG. 3(b) described above, for the six digits of key input, the pattern is "first digit, second digit, dummy, third digit, dummy, dummy" of the input passcode inputted by the user.

After the input passcode extraction section 124 generates the extraction pattern as such, and then extracts "the first digit, the second digit, and the third digit" of the input passcode inputted by the user from the contents of the six digits of key input in accordance with the extraction pattern (step S8).

The collation section 130 performs collation between the input passcode (passcode for collation) of three digits extracted by the input passcode extraction section 124 and the passcode registered in the storage section 140. In this collation, when both agree with each other, authentication OK is concluded. When they do not agree with each other, authentication NG is concluded (step S9).

As described above, in the embodiment of the present invention described above, the initial pattern is generated at random and then, when the initial pattern is changed, as described above in FIG. 3, the authentication result is concluded as NG even when the same key input string is inputted. As such, the passcode substantially works like a one-time password. That is, although the same passcode is used, the contents of key input for achieving authentication OK vary at each time of input. Thus, satisfactorily security of high level can be ensured even as a countermeasure against a case that the movement of the inputting hand and the display screen have been peeped by the third person.

Further, as a key input string capable of achieving correct passcode authentication, in addition to the two patterns of timing of inputting the first character of the passcode as shown in FIGS. 2(a) and 2(b), an arbitrary key having a predetermined key color can be selected as each dummy input. Thus, a feature like that a particular input digit corresponds to which digit of the input passcode inputted by the user is absent. Thus, even when the hand and the input screen have been seen from the third person at the time of input, it is made remarkably difficult that the third person guesses the passcode. Further, satisfactory encryption strength can be achieved even against a replay attack that retry is repeated.

Further, the same number of digits of a dummy code is contained in the passcode, that is, the passcode is inputted as the twice number of digits. Thus, rigid security can be achieved.

In spite of this, the user can achieve operation merely by easy work of inputting the passcode at the time of the predetermined key color and, at the time of the other key color, inputting a suitable key of the key color. As such, without degrading user convenience, the above-mentioned security of high level can be realized.

Further, in a case that passcode authentication OK has been achieved, the initial pattern is reset at random at the next time of passcode input. Then, in a case of authentication NG, the initial pattern is maintained intact also at the next time of passcode input. Thus, the probability that the initial patterns agree with each other by coincidence can be made zero and hence security of higher level can be realized.

In particular, in a case that the input information authentication device 100 of the present embodiment is a portable information terminal of touch panel type, a situation can occur that authentication information is inputted on a train, in a crowd, or the like. In such a case, a possibility arises that the inputting hand and the display screen are seen by the third person in a very close distance like over the shoulder. As such, an input information authentication device excellent in security can be obtained in which even when the hand inputting authentication information and the display screen are seen, guess of the passcode from the information having been seen is difficult.

Further, in particular, in a case of a beginner, an elderly person, or the like, a situation can occur that the speed of key input is extremely slow at the time of passcode input. Thus, when the situation is watched by the third person, a possibility arises that the movement of the hand and the display screen are easily memorized.

According to the embodiment described above, even in such a case, satisfactorily security of high level is ensured as described above.

[Second Embodiment]

Next, a second embodiment of the present invention is described below.

In the second embodiment, the functions such as generation of the initial pattern and storage and collation of the passcode in the first embodiment described above are realized by using a server device.

Description is omitted for like points to the first embodiment described above.

As shown in FIG. 5, an input information authentication system serving as the second embodiment is constructed such that the input information authentication device 100 and the server device 200 is connected to each other through a network.

The input information authentication device 100 includes a display input section 110, a display input control section 310, and a communication section 150.

The communication section 150 is connected through the network to the communication section 250 of the server device 200 by cable, by wireless, or by a combination of these, so as to perform communication with the server device 200.

On the basis of the contents of transmission and reception with the server device 200 through the communication section 150, the display input control section 310 performs display control and the like of the input keys displayed on the display input section 110. Further, the display input control section 310 includes a pattern reversing section 122 similar to that of the first embodiment described above.

The server device 200 includes a display input control section 320, a collation section 230, a storage section 240, and a communication section 250.

The communication section 250 is connected through the network to the communication section 150 of the input information authentication device 100 by cable, by wireless, or by a combination of these, so as to perform communication with the input information authentication device 100.

The display input control section 320 performs communication with the input information authentication device 100 through the communication section 250 and thereby perform display control and the like of the input keys displayed on the display input section 110 of the input information authentication device 100. Further, the display input control section 320 includes an initial pattern generation section 221, an input color judgment section 223, and an input passcode extraction section 224 similar to those of the first embodiment described above.

Figure 6:
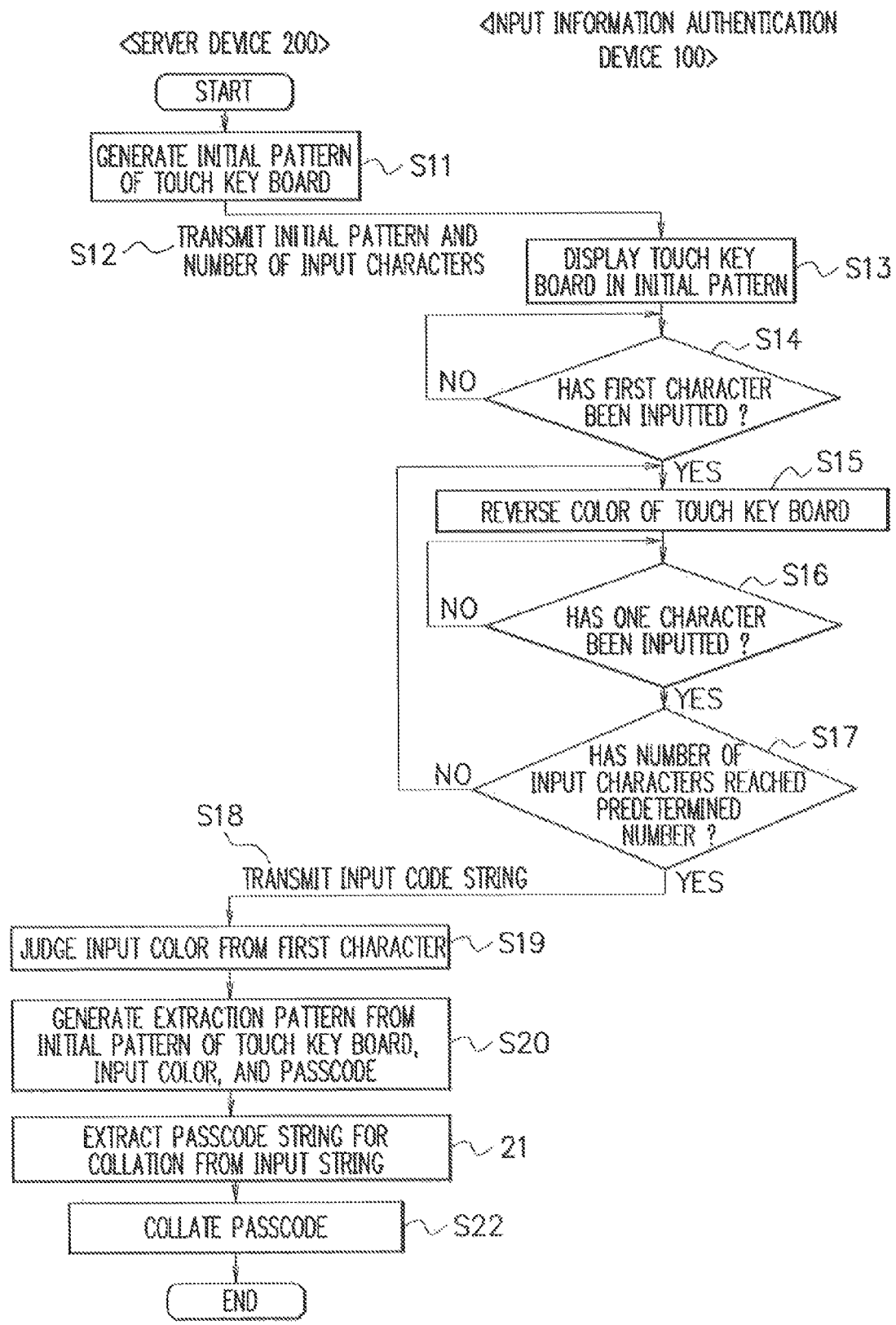
FIG. 6 is a flow chart showing an example of operation of an input information authentication system serving as a second embodiment.

Next, an example of operation of the input information authentication system serving as the second embodiment is described below with reference to the flow chart of FIG. 6. In the operation of the present embodiment described below, it is premised that the passcode used in the input information authentication device 100 is registered in advance in the storage section 240 of the server device 200.

First, the initial pattern generation section 221 of the server device 200 generates an initial pattern of the touch key board displayed on the touch panel display serving as the display input section 110 in the input information authentication device 100 (step S11). The generation of the initial pattern may be similar to that of the first embodiment described above.

When the initial pattern generation section 221 has generated the initial pattern, the communication section 250 transmits the generated initial pattern and the number of input characters to the input information authentication device 100 (step S12). The number of input characters is the twice number of digits obtained when the number of digits of the passcode is added with the same number of digits for a dummy code, and is six characters in the examples of FIGS. 2 and 3 in the first embodiment described above.

On the basis of the initial pattern and the number of input characters received from the server device 200 through the communication section 150, first, the display input control section 310 of the input information authentication device 100 displays the touch key board in the initial pattern on the display input section 110 (step S13).

When the first character has been inputted to the touch key board (step S14), for the purpose of the next key input, the pattern reversing section 122 generates a display pattern obtained by reversing the initial pattern. Then, the touch key board is displayed in the reversed pattern on the display input section 110 (step S15).

When next key input is performed in the touch key board displayed in the reversed pattern (step S16), the operation of steps S15 and S16 is repeated until the number of input characters reaches the predetermined number (step S17). That is, the pattern reversing section 122 repeats the operation of generating a display pattern obtained by reversing the display pattern used in the previous key input and then of receiving next key input.

As such, when the predetermined number, that is, the number of input characters, received from the server device 200 is inputted, the display input control section 310 transmits the input code string in the number of input characters to the server device 200 through the communication section 150 (step S18).

When the input code string is received from the input information authentication device 100 through the communication section 250, on the basis of the input contents of the first character, the input color judgment section 223 of the server device 200 judges the input color to be recognized as a recognition object (step S19). The method of determination may be similar to that of the first embodiment described above.

On the basis of the initial pattern generated at step S11, the input color judged at step S19, and the passcode, the input passcode extraction section 224 distinguishes between the dummy code and the input passcode inputted by the user and then generates an extraction pattern for extracting the input passcode inputted by the user from the contents of the six digits of key input (step S20). The generation of the extraction pattern may be similar to that of the first embodiment described above.

As such, the input passcode extraction section 224 generates the extraction pattern and then, in accordance with the extraction pattern, extracts "the first digit, the second digit, and the third digit" of the input passcode inputted by the user from the input code string of six digits received from the input information authentication device 100 (step S21).

The collation section 230 performs collation between the input passcode (passcode for collation) of three digits extracted by the input passcode extraction section 224 and the passcode registered in the storage section 240. In this collation, when both agree with each other, authentication OK is concluded. When they do not agree with each other, authentication NG is concluded (step S22).

As described above, according to the second embodiment described above, effects similar to those of the first embodiment described above are obtained. In addition, the server device 200 protected with more rigid security than the input information authentication device 100 composed of a terminal is employed as the storage site for the passcode. Thus, security is improved further.

Further, the server device 200 generates the initial pattern. Then, the server device 200 receives an input code string based on the initial pattern from the input information authentication device 100, and then processes the data. This realizes an authentication effect like challenge and response and hence provides a protection effect against spoofing of the terminal itself (including the spoofing of a program on the terminal).

[Third Embodiment]

Next, a third embodiment of the present invention is described below.

In the third embodiment, the registered passcode is stored after being encrypted by using a one-way function such as a hash function. Then, in this state, collation of the input passcode inputted by the user is achievable.

Description is omitted for like points to the first embodiment described above.

Figure 7:
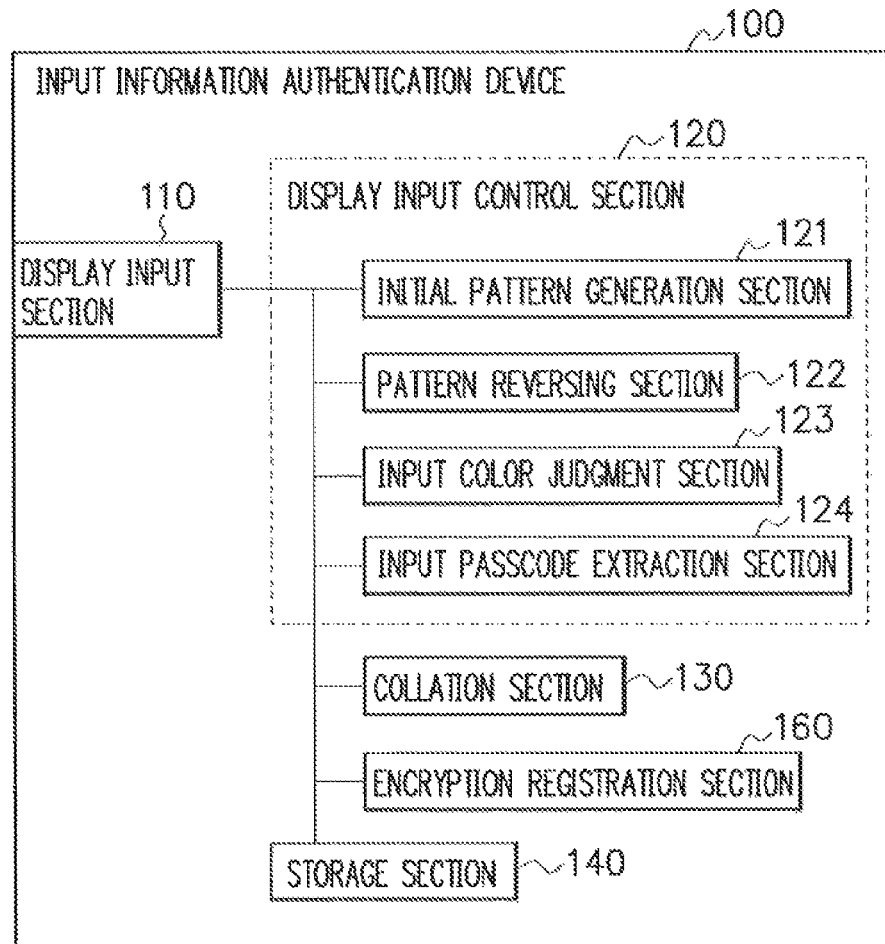
FIG. 7 is a block diagram showing an exemplary configuration of an input information authentication device 100 serving as a third embodiment.

As shown in FIG. 7, in addition to the configuration of the first embodiment described above, the input information authentication device 100 serving as the third embodiment includes an encryption registration section 160 for encrypting the passcode with a one-way function such as a hash function. The storage section 140 stores the passcode encrypted by the encryption registration section 160.

The operation that in the input information authentication device 100 of the present embodiment, at the time of being registered into the device, the passcode is stored in a manner of being encrypted is described below with reference to the flow chart of FIG. 8. The following example of operation is described for a case that md5 is employed as a hash function. Then, a hash code obtained by hashing a numerical value x is expressed as md5(x).

When a passcode to be registered is inputted, the input passcode extraction section 124 generates, in advance, extraction patterns for all combinations of initial patterns and input colors of the touch key board (step S31). These combinations of initial patterns and input colors may be prepared for all patterns ($2^9$ kinds when the number of input keys is nine) allowed from the combinations for the number of input keys. Alternatively, combinations of initial patterns and input colors to be used may be determined in advance (e.g., 30 patterns) and then patterns merely in the determined number may be prepared.

The encryption registration section 160 assigns each digit of the passcode to the generated extraction pattern, then decomposes the extraction pattern into individual digits, and then hashes them (step S32) (first encryption means). Then, the hash codes for the individual digits having undergone this hashing are collected as a group and then stored into the storage section 140 in a manner of being in correspondence to the combination of the initial pattern and the input color of the touch key board (step S33).

Figure 9:
FIG. 9 is a diagram showing an example of decomposing an extraction pattern into each digit and then hashing each.

FIG. 9 shows an example of decomposing an extraction pattern into individual digits and then hashing them. The example of FIG. 9 describes a case that similarly to the example of FIG. 2(a) described above, for the key input of six digits, the extraction pattern is "first digit, dummy, second digit, third digit, dummy, dummy" of the input passcode inputted by the user and that the passcode is "1, 2, 3".

When each digit of the passcode is assigned to the extraction pattern and a dummy code is designated by "*", "1, *, 2, 3, *, *" is obtained as shown in the example of FIG. 9. Here, when the passcode of three digits is decomposed into individual digits, "100000", "2000", and "300" are obtained. For the purpose of expressing the digit in the extraction pattern of the decomposed passcode, the other digits are indicated with "0".

As the numeric character for indicating the other digits, a numeric character not used in the passcode is adopted. The present embodiment is described on a premise that the authentication information is a passcode composed of any numeric characters 1 to 9. Thus, the other digits are indicated with "0". For example, when the authentication information is a passcode composed of any numeric characters 0 to 9, "10" in a numeric character string expressed in hexadecimal numbers may be adopted as the other digits so that implementation may be achieved similarly.

Then, each of "100000", "2000", and "300" obtained when the operation of expressing the digit position by using "0" not used in the passcode is performed on each numeric character of the decomposed passcode obtained by decomposition into each digit is hashed with md5. Then, md5(100000), md5(2000), and md5(300) which are a group of hash codes having undergone the hashing are stored into the storage section 140 in a manner of being in correspondence to the combination of the initial pattern and the input color of the touch key board (the combination in FIG. 2(a), in the example of FIG. 9).

Figure 10:
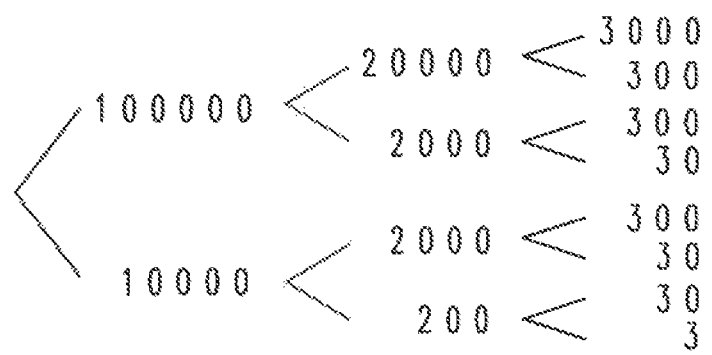
FIG. 10 is a diagram showing an example of decomposing a passcode into each digit for the purpose of hashing.

FIG. 10 shows an example of decomposition for each digit of the passcode. The example of FIG. 10 shows a case that the passcode is "1, 2, 3".

In the decomposition for each digit of the extraction pattern described above in FIG. 9, at the time of passcode input, the input is received with reversing successively the two key colors in the initial pattern. Thus, any one of two characters inputted successively should be the next character of the passcode.

For example, as shown in FIG. 10, when the passcode is "1, 2, 3", "1" of the passcode first digit should be any one of the first character and the second character in the input code string inputted by the user. That is, in a state of being decomposed into each digit of the extraction pattern, the data should be any one of "100000" and "10000".

Similarly, "2" of the passcode second digit should be any one of the second character to the fourth character in the input code string inputted by the user. That is, in a state of being decomposed into each digit of the extraction pattern, the data should be any one of "20000", "2000", and "200".

Further, "3" of the passcode third digit should be any one of the third character to the sixth character in the input code string inputted by the user. That is, in a state of being decomposed into each digit of the extraction pattern, the data should be any one of "3000", "300", "30", and "3".

As such, as shown in FIG. 10, when the passcode is "1, 2, 3", there exist eight kinds of states that the passcode is decomposed into each digit of the extraction pattern.

Figure 8:
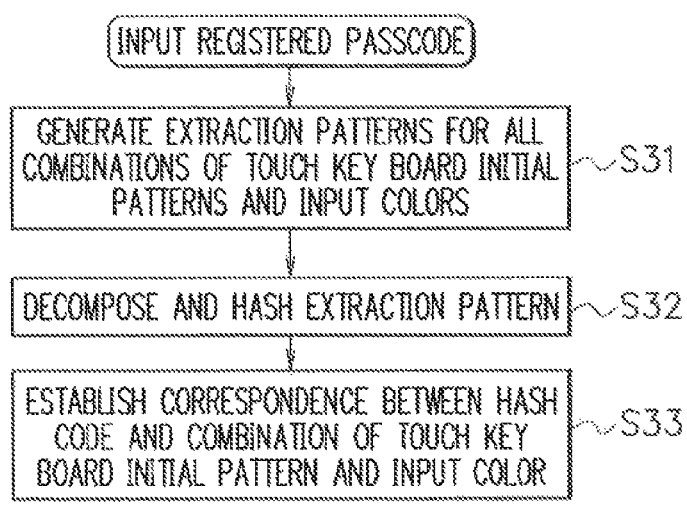
FIG. 8 is a flow chart showing an example of operation at the time of passcode registration in a third embodiment.

At step S33 of FIG. 8 described above, the group of hash codes having been decomposed into each digit and then undergone hashing as described above in the example of FIG. 9 is stored into the storage section 140 in a manner of being in correspondence to any one of the eight kinds for the combinations of initial patterns and input colors of the touch key board.

By virtue of this, even if the third person who has acquired the input information authentication device 100 would try to analyze the storage information in the storage section 140, the registered passcode can be made unknown and, in addition, the correspondence between each input digit in the extraction pattern and each digit of the input passcode inputted by the user can also be made unknown.

Next, an example of operation at the time that the input information authentication device 100 according to the third embodiment receives passcode input from the user is described below with reference to the flow chart of FIG. 11.

As the operation of receiving the passcode input, the operation of steps S41 to S46 is similar to the operation of steps S1 to S6 in the flow chart of FIG. 4 described above in the first embodiment.

As such, when the predetermined number of digits, that is, the twice number of digits obtained when the number of digits in the passcode is added with the same number of digits for a dummy code are inputted, similarly to the operation at the time of passcode registration, the encryption registration section 160 decomposes into each digit the input code string inputted by the user and then hashes each with md5 (step S47) (second encryption means).

The collation section 130 performs collation between the hash code stored in the storage section 140 in a manner of being in correspondence to the initial pattern and the input color of the touch key board and the hash code hashed at step S47 (step S48).

Here, the input code string contains dummy codes. Thus, the number of hash codes obtained from the input code string hashed at step S47 is greater than the number of hash codes related to the initial pattern and the input color of the touch key board. For example, when the passcodes has three digits, there are three hash codes related to the initial pattern and the input color of the touch key board and hence there are six hash codes obtained from the input code string hashed at step S47.

Thus, for each of the hash codes obtained from the input code string hashed at step S47, starting at the high-order digit of the input, retrieval is performed whether agreement is obtained in any one of the hash codes related to the initial pattern and the input color of the touch key board. Then, collation is performed whether agreement is obtained in the hash codes related to the initial pattern and the input color of the touch key board, that is, all hash codes obtained from the registered passcode. Then, when an agreeing hash code is detected, collation OK is concluded and hence passcode authentication OK is concluded.

A detailed example is as follows. For example, for the initial pattern and the input color of the touch key board shown in the example of FIG. 3(a), when the input code string is "1, 5, 2, 3, 6, 4" as shown in the example of this FIG. 3(a), the hash codes obtained from the input code string hashed at step S47 are the following six.

"md5(100000)"
"md5(50000)"
"md5 (2000)"
"md5(300)"
"md5(60)"
"md5(4)"

In contrast, for example, the hash codes stored in the storage section 140 in a manner of being in correspondence to the initial pattern and the input color of the touch key board as shown in the example of FIG. 3(a) are the following three.

"md5(100000)"
"md5 (2000)"
"md5(300)"

When collation is performed between these as described above, for all of the three hash codes related to the initial pattern and the input color of the touch key board, an agreeing hash code is detected from among the six hash codes hashed at step S47. Thus, collation at step S48 is concluded as OK and hence passcode authentication OK is concluded.

As described above, according to the third embodiment described above, effects similar to those of the first embodiment described above are obtained. In addition, the passcode is stored in a manner of being encrypted by using a one-way function such as a hash function. Thus, even when the input information authentication device 100 is acquired by the third person, protection can be achieved against the analysis of the storage information in the memory. In spite of this, even in a case of passcode input containing a dummy code similar to the first embodiment described above, collation of the input passcode can be performed reliably. This realizes security of higher level.

Further, in the collation method of the third embodiment described above, collation can be performed in a remarkably smaller amount of computation than a case that an advanced calculation technique is employed like calculation for collation is performed in a state of being encrypted. Thus, in particular, the present technique can be implemented easily even in a computer having a relatively low processing performance such as a mobile terminal.

[Fourth Embodiment]

Next, a fourth embodiment of the present invention is described below.

The fourth embodiment shows another configuration example that the registered passcode is stored after being encrypted by using a one-way function such as a hash function. Then, in this state, collation of the input passcode inputted by the user is achievable.

Description is omitted for like points to the third embodiment described above.

The operation that in the input information authentication device 100 of the present embodiment, at the time that the passcode is registered by the user, the passcode is stored in a manner of being encrypted is described below.

When a passcode to be registered is inputted, the encryption registration section 160 hashes the numeric character string of the registered passcode (first encryption means) and then stores the data into the storage section 140.

For example, when the registered passcode is "123" as shown in the example of FIG. 2 described above, the encryption registration section 160 stores the hashed md5(123) into the storage section 140.

Figure 12:
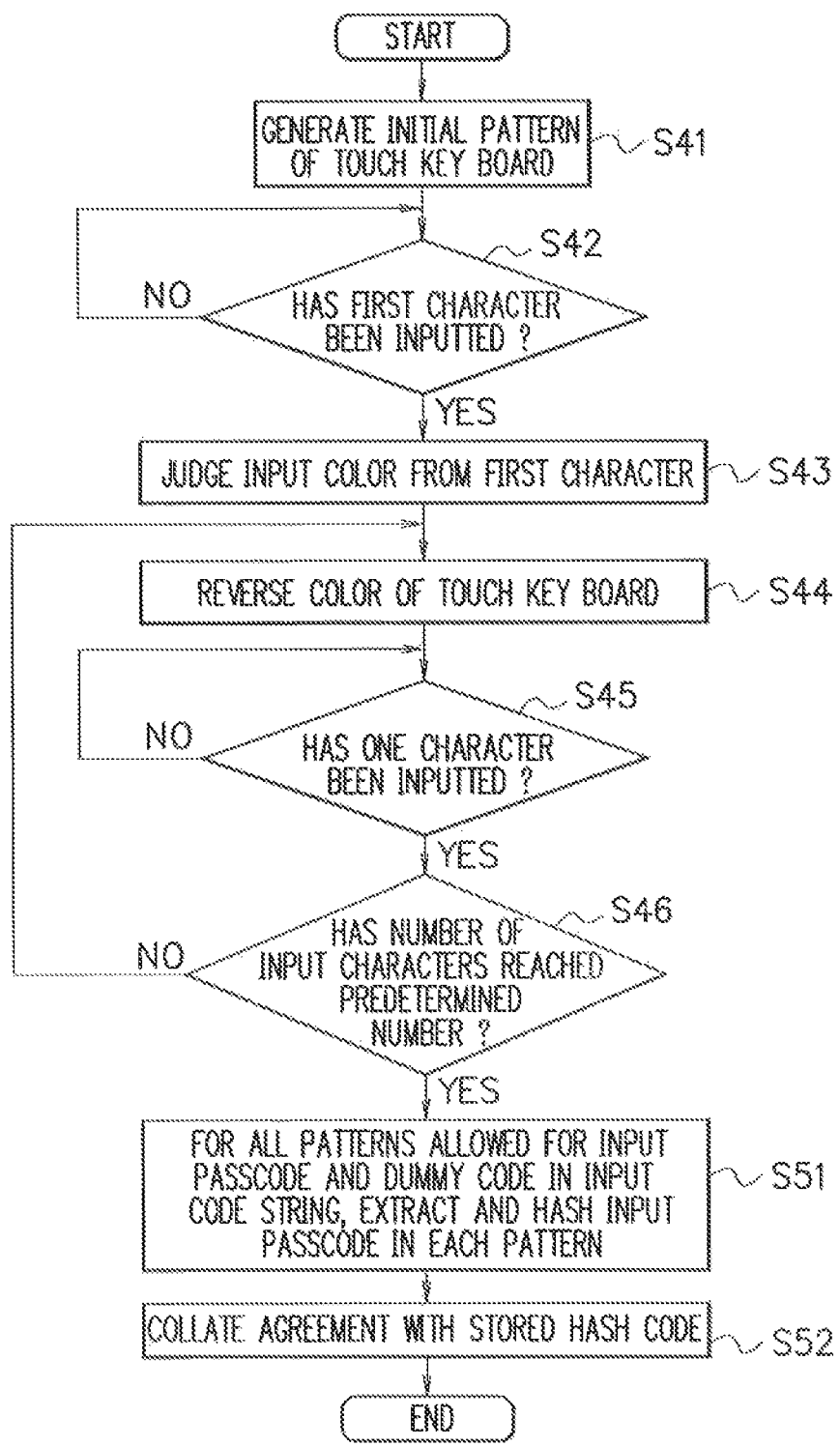
FIG. 12 is a flow chart showing an example of operation of an input information authentication device 100 serving as a fourth embodiment.

Next, an example of operation at the time that the input information authentication device 100 according to the fourth embodiment receives passcode input from the user is described below with reference to the flow chart of FIG. 12.

As the operation of receiving the passcode input, the operation of steps S41 to S46 is similar to that of the third embodiment described above.

As such, when the predetermined number of digits, that is, the twice number of digits obtained when the number of digits in the passcode is added with the same number of digits for a dummy code are inputted, on the basis of all patterns allowed for the input passcode inputted by the user and the dummy code, the input passcode extraction section 124 extracts an input passcode in a case of each pattern from the input code string inputted by the user. The encryption registration section 160 hashes each extracted input passcode with md5 (step S51).

The collation section 130 performs collation between the hash code having been hashed as such and the hash code stored in the storage section 140 (step S52). As a result of this collation, in a case of collation agreement, authentication OK is concluded. In other cases, authentication NG is concluded.

The following description is given for patterns prepared in advance as all patterns allowed for the input passcode inputted by the user and the dummy code.

First, the passcode first digit should be any one of the first character and the second character in the input code string inputted by the user.

Further, when the passcode first digit is the first character of the input code string inputted by the user, the passcode second digit should be any one of the second character and the third character of the input code string. Further, when the passcode first digit is the second character of the input code string inputted by the user, the passcode second digit should be any one of the third character and the fourth character of the input code string.

As such, as for the number of patterns of whether the input passcode is arranged at which character position of the input code string inputted by the user, when the number of passcodes is three, there exist $2^3=8$ kinds when as described above in FIG. 10.

As described above, when the number of registered passcodes is three, all patterns allowed for the input passcode inputted by the user and the dummy code are the following eight kinds.

"(first digit), (second digit), (third digit), *, *, *"
"(first digit), (second digit), *, (third digit), *, *"
"(first digit), *, (second digit), (third digit), *, *"
"(first digit), *, (second digit), *, (third digit), *"
"*, (first digit), (second digit), (third digit), *, *"
"*, (first digit), (second digit), *, (third digit), *"
"*, (first digit), *, (second digit), (third digit), *"
"*, (first digit), *, (second digit), *, (third digit)"

A detailed example is as follows. For example, when the input code string is "1, 5, 2, 3, 6, 4" shown in the example of FIG. 3(*a*), input passcode candidates extracted at step S51 by the input passcode extraction section 124 are eight kinds of "152", "153", "123", "126", "523", "526", "536", and "534".

Thus, the hash codes hashed by the encryption registration section 160 are the following eight kinds.
"md5(152)"
"md5(153)"
"md5(123)"
"md5(126)"
"md5(523)"
"md5(526)"
"md5(536)"
"md5(534)"

In contrast, the hash code for the registered passcode stored in the storage section 140 is "md5(123)". When collation is performed between these as described above, an agreeing hash code is detected. Thus, collation at step S52 is concluded as OK and hence passcode authentication OK is concluded.

As described above, according to the fourth embodiment described above, effects similar to those of the third embodiment described above are obtained.

Further, in the fourth embodiment, at the time of passcode registration, when the registered passcode is merely simply hashed, analysis of the registered passcode can be made unachievable. In addition, arrangement of the dummy code in the input code string can also be made unknown. Further, the correspondence relation between the initial pattern and the input contents for achieving authentication OK can also be made completely unknown. Thus, the information indicating which input digit is treated as an input passcode for the combination of the initial pattern and the input color can also be protected.

Further, by virtue of the above-mentioned configuration, the resistance of the hashed passcode against a brute-force attack can be the number-of-passcode-digits-th power of the number of keys ($9^3=729$ kinds for nine keys and three-digit passcode in the example of FIG. 2). That is, when a configuration is employed that collation is performed in a state that the registered passcode has been hashed, resistance against an attack of guessing the registered passcode by a brute-force approach is not degraded.

Further, collation is performed in a state that the patterns allowed for the arrangement of the input passcode and the dummy code have been hashed. This avoids a situation that a passcode pushed in an incorrect timing goes into agreement by coincidence. That is, a rule that even when the registered passcode has not been inputted in a correct input timing and then the user performs key input, authentication NG is concluded at the time that input is not performed in the correct input timing can be executed reliably.

[On Individual Embodiments]

Here, the individual embodiments described above are preferred embodiments of the present invention. The present invention is not limited to these and various kinds of modifications can be implemented in accordance with the technical idea of the present invention.

For example, each embodiment given above has been described for an example that the passcode is three digits of "1, 2, 3". However, the number of digits of the passcode is not limited to this value and may be arbitrarily defined in accordance with the performance of the device and the like. Obviously, when the number of digits of the passcode is increased, security is improved further.

Further, the embodiments given above have been described for a case that a passcode consisting of numeric characters is used as the authentication information. However, the authentication information is not limited to this as long as capable of being expressed as a numeric character string. That is, characters such as alphabets, strokes, a combination of these, or the like may be employed.

In this case, for example, in a case of alphabets, the display input section 110 may display a touch key board consisting of alphabet keys and then the inputted alphabets A to Z may be treated as numbers 1 to 26 or alternatively the character string may be converted into a numeric character string in accordance with the ASCII code. As such, implementation can be achieved similarly to the embodiments described above. Further, in a case of strokes, the coordinates of the input start point and the coordinates of the end point may be treated as a numeric character string so that implementation can be achieved similarly to the embodiments described above.

Further, as the display information on the basis of which the user identifies the keys, images may be used in place of characters and numeric characters. In this case, the method of dividing the input keys into two regions and then displaying the keys of each region in a manner of being separated in two states may be, for example, a method that the display region for the keys in one state is masked in white, gray, black, or the like and that the display region for the keys in the other state is masked in a different color or not masked.

Further, as for the authentication of the input information described above, a numeric character such as a key number and a key display coordinate may be assigned to the region assigned to each input key in the image so that processing can be performed similarly. Further, as in the second embodiment described above, when a configuration is employed that the authentication information is registered in the server device 200, the server device 200 may generate image information having undergone such region dividing and state dividing, and then transmit the image information as an initial pattern described above to the input information authentication device 100. Then, the input information authentication device 100 may display the image information as the image of the initial pattern and then reverse the two states. As such, processing can be performed similarly to the second embodiment described above.

As such, the authentication information capable of being used in the embodiments described above may be a numeric character string, a character string, an image string, coordinate information, a combination of these, or the like as long as capable of being expressed as a numeric character string as a result of conversion defined in advance.

Further, the embodiments given above have been described for a case that the two regions are divided by using the display color and then reversed at each time of input of one character. However, the timing of reversing is not limited to each time of input of one character. That is, a configuration may be employed that reversing is performed at each time that input operation has been performed in a predetermined number of times like at each time of input of two characters. Further, for example, a configuration may be employed that reversing is performed suitably in a timing defined in advance like after the input operation of the third character and after the input operation of the fifth character.

In this case, the pattern reversing section 122 reverses the initial pattern in the timing defined in advance.

Further, in the fourth embodiment described above, at step S51 of FIG. 12, the input passcode extraction section 124 extracts the input passcode from the input code string for all patterns of the input passcode and the dummy code allowed in accordance with the reversing in the predetermined timing. Then, the input passcodes exerted from the input code string for all patterns of the input passcode and the dummy code allowed in accordance with the reversing in the predetermined timing are hashed by the encryption registration section 160 and then collation is performed by the collation section 130. As such, processing can be performed similarly.

Further, the third and the fourth embodiments given above have been described for an example that encryption using a one-way function is hashing with md5. However, the encryption using a one-way function may be an arbitrary method. That is, for example, even in a case of hashing by HMAC, the present invention can be implemented similarly.

Further, the embodiments given above have been described for a case that the keys are divided into two regions by using the display color. However, employable methods are not limited to the method of dividing by using the display color as long as the keys can be divided into two regions. That is, an arbitrary method of state dividing may be employed as long as the state dividing is in a manner that two different kinds of states can be recognized by the person like a method that the feeling of touch to the keys is changed.

Further, each embodiment given above has been described for a case that key input to the touch key board displayed on the touch panel display of the display input section 110 is performed by the user. However, the input section and the display section are not limited to the touch key board and may be a physical keyboard as long as being provided with a mechanism of changing the key state such as the key color and the feeling of touch.

Further, each embodiment described above is not limited to the configuration that the input section and the display section are integrated with each other. That is, the input section and the display section may be separated from each other or alternatively may be in the form of separate devices. Even in this case, the present invention can be implemented similarly.

In a case that the input section and the display section are separated from each other, the same key as the input section is displayed on the display section. Then, in a state that the key color in the display section indicates whether each key of the input section is in the key color of recognition object or in the key color of non-recognition object, key input is received. Even by virtue of such a configuration, each embodiment described above can be implemented similarly so that similar effects can be obtained.

Further, the input information authentication device 100 of each embodiment described above is not limited to a portable information terminal and may be applied similarly to an installation type device such as a desktop PC.

Further, each embodiment given above has been described for a case that the input keys are pattern-divided into two regions of colored keys and white keys. Instead, a key region to be treated as not being a recognition object may be determined in advance and then the keys in the region may be hide-displayed in gray or the like. In this case, the input color judgment section 123 and the judgment step in each embodiment described above become unnecessary.

By virtue of this, the user can easily be notified that key input is to be performed by using keys of the same color.

Further, a configuration may be employed that a key color to be treated as the input color is determined in advance and then the keys having a color not being the input color may be in an input-inhibited state that input is inhibited. In this case, the input color judgment section 123 and the judgment step in each embodiment described above become unnecessary. Further, in such a configuration, the user may determine the input color and then the input color is set up in the device in advance.

By virtue of this, the configuration becomes such that input is allowed only to the keys of the same color. Thus, the input rule can easily be recognized by the user.

Further, a processing procedure for realizing the input information authentication device 100 and the server device 200 serving as each embodiment described above may be recorded as a program into a recording medium. Then, the above-mentioned each function in each embodiment of the present invention may be realized when the program provided from the recording medium is executed by a CPU of a computer constituting the system.

In this case, the present invention is applied even to a case that an information group including the program is provided to an output device from the above-mentioned recording medium or alternatively from an external recording medium through a network.

That is, the program code itself having been read from the recording medium implements the new function of the present invention. Thus, the recording medium that stores the program code and the signal having been read from the recording medium constitute the present invention.

This recording medium may be, for example, a hard disc, an optical disc, a magneto-optical disc, a floppy (registered trademark) disc, a magnetic tape, a nonvolatile memory card, and a ROM.

According to the program of the present invention, a computer controlled by the program can implement each function in each embodiment described above.

DESCRIPTION OF REFERENCE NUMERALS 100 input information authentication device
110 display input section
120 display input control section
121 initial pattern generation section
122 pattern reversing section
123 input color judgment section
124 input passcode extraction section
130 collation section
140 storage section
150 communication section
160 encryption registration section (an example of first encryption means and second encryption means)
200 server device

The invention claimed is:

1. An input information authentication device for performing authentication which is judgment of collation between information corresponding to operated keys of input means provided with a plurality of keys and authentication information stored in advance, comprising:
a display input section: and
a display input control section, wherein
the plurality of keys are assigned to a first region and a second region, wherein
the first region and the second region transit such that when one of the regions is in a first state, the other region goes into a second state which is not the first state, and wherein
information corresponding to an operated key of the input means when a region where a key to be operated for performing input to be collated with the authentication information is arranged is in the first state is used in the authentication and information corresponding to the operated key of the input means when a region where the key to be operated for performing input to be collated with the authentication information is arranged is in the second state is not used in the authentication,
the display input control section assigns the plurality of keys to any one of the first region and the second region, causes the first region and the second region to transit between the first state and the second state,
does not use, in the authentication, information corresponding to the operated key of the input means when a region where a key to be operated for performing input to be collated with the authentication information is arranged is in the second state, and
when the first character inputted through the input means agrees with the first character of the authentication information stored in advance, assigns to the first state the region where the key of the first character belong and assigns the other region to the second state and, after that, causes the region where the key of the first character belongs and the other region to transit between the first state and the second state transit and,
when the first character inputted through the input means does not agree with the first character of the authentication information stored in advance, assigns to the second state the region where the key of the first character belong and assigns the other region to the first state and, after that, causes the region where the key of the first character belongs and the other region to transit between the first state and the second state transit.

2. The input information authentication device according to claim 1, wherein
whether the plurality of key's are to be assigned to the first region or the second region is selected at random as an initial state, and wherein
at each time that one character is inputted from the input means, the first region and the second region transit between the first state and the second state.

3. The input information authentication device according to claim 1, wherein
the authentication information stored in advance is information capable of being expressed as a numeric character string, and wherein
the input information authentication device comprises:
first encryption means for decomposing authentication information expressed as a numeric character string into each digit and then encrypting it by using a one-way function;
second encryption means for expressing as a numeric character string the input information inputted from the input means, then decomposing it into each digit, and then encrypting it by using the one-way function; and
collation means for performing collation between the encrypted character string obtained by the first encryption means and the encrypted character string obtained by the second encryption means.

4. The input information authentication device according to claim 3, wherein
the first encryption means decomposes the authentication information expressed as the numeric character string into numeric characters in individual digits, then for the numeric character string in the number of input characters including a dummy input, expressing the position of each digit where the decomposed numeric character exists by using a numeric character not used in the authentication information, and then encrypting by using the one-way function the numeric character whose position has been expressed, and wherein the second encryption means expresses as a numeric character string the input information inputted from the input means, then decomposes the numeric character string into numeric characters in individual digits, expressing the position of each digit where the decomposed numeric character exists within the numeric character string, of the input information by using a numeric character not used in the authentication information, and then encrypting by using the one-way function the numeric character whose position has been expressed.

5. The input information authentication device according to claim 1, wherein
the authentication information stored in advance is information capable of being expressed as a numeric character string, and wherein
the input information authentication device comprises:
first encryption means for encrypting by using a one-way function the authentication information expressed as a numeric character string;
second encryption means for extracting information to be used in the authentication from the input information inputted from the input means, for each possible pattern of input operation of information to be used in the authentication and then encrypting the extracted information by using the one-way function; and collation means for performing collation between the encrypted character string obtained by the first encryption means and the encrypted character string obtained by the second encryption means.

6. The input information authentication device according to claim 1, including communication means for receiving control from display input control section in the outside of the device, wherein
on the basis of control from the display input control section through the communication means,
the plurality of keys are assigned to any one of the first region and the second region, and
information corresponding to the operated key of the input means when a region where the key to be operated for performing input to be collated with the authentication information is arranged is in the second state is not used in the authentication.

7. The input information authentication device according to claim 6, wherein
the communication means transmits the contents inputted from the input means to a server device, and wherein
the server device comprises:
storage means for storing the authentication information in advance; and
collation means for performing collation. with the authentication information on the basis of the contents inputted from the input means.

8. The input information authentication device according to claim 1, including display means for displaying, by means of display of key images, whether each of the plurality of keys is assigned to the first region or assigned to the second region.

9. The input information authentication device according to claim 8, wherein the input means detects a position of contact to a front surface screen of the display means and then, on the basis of the position information concerning the contact position, determines one of the plurality of keys as being intended by input.

10. A server device used in a state of being connected to an input information authentication device by cable, by wireless, or by a combination of these, the server device comprising:
a communication section;
a display input control section connected to the input information authentication device for controlling the input information authentication device, wherein
the input information authentication device includes input means for performing key input and communication means for receiving the control from the display input control section, wherein
the input means includes a plurality of keys, wherein
the display input control section assigns the plurality of keys to any one of a first region and a second region, wherein
the first region and the second region transit such that when one of the regions is in a first state, the other region goes into a second state which is not the first state, and wherein
the display input control section uses, in authentication, information corresponding to an operated key of the input means when a region where a key to be operated for performing input to be collated with authentication information is arranged is in the first state, and does not use, in authentication, information corresponding to the operated key of the input means when a region where the key to be operated for performing input to be collated with the authentication information is arranged is in the second state, wherein the display input control section assigns the plurality of keys to any one of the first region and the second region, causes the first region and the second region to transit between the first state and the second state,
does not use, in the authentication, information corresponding to the operated key of the input means when a region where a key to be operated for performing input to be collated with the authentication information is arranged is in the second state, and
when the first character inputted through the input means agrees with the first character of the authentication information stored in advance, assigns to the first state the region where the key of the first character belong and assigns the other region to the second state and, after that, causes the region where the key of the first character belongs and the other region to transit between the first state and the second state transit and,
when the first character inputted through the input means does not agree with the first character of the authentication information stored in advance, assigns to the second state the region where the key of the first character belong and assigns the other region to the first state and, after that. causes the region where the key of the first character belongs and the other region to transit between the first state and the second state transit.

11. The server device according to claim 10, wherein the display input control section assigns each of the plurality of keys to any one of the first region and the second region and transmits display images of the plurality of assigned keys through the communication means to the input information authentication device.

12. An input information authentication system comprising an input information authentication device and a server device connected to each other by cable, by wireless, or by a combination of these, wherein
the server device includes display input control section for controlling the input information authentication device, wherein
the input information authentication device includes input means for performing key input and communication means for receiving the control from the display input control section, wherein
the input means includes a plurality of keys, wherein
the display input control section assigns the plurality of keys to any one of a first region and a second region, wherein
the first region and the second region transit such that when one of the regions is in a first state, the other region goes into a second state which is not the first state, and wherein
information corresponding to an operated key of the input means when a region where a key to be operated for performing input to be collated with authentication information is arranged is in the first state is used in the authentication and information corresponding to the operated key of the input means when a region where the key to be operated for performing input to be collated with the authentication information is arranged is in the second state is not used in the authentication, wherein the display input control section assigns the plurality of keys to any one of the first region and the second region, causes the first region and the second region to transit between the first state and the second state,
does not use, in the authentication, information corresponding to the operated key of the input means when a region where a key to be operated for performing input to be collated with the authentication information is arranged is in the second state, and when the first character inputted through the input means agrees with the first character of the authentication information stored in advance, assigns to the first state the region where the key of the first character belong and assigns the other region to the second state and, after that, causes the region where the key of the first character belongs and the other region to transit between the first state and the second state transit and, when the first character inputted through the input means does not agree with the first character of the authentication information stored in advance, assigns to the second state the region where the key of the first character belong and assigns the other region to the first state and, after that, causes the region where the key of the first character belongs and the other region to transit between the first state and the second state transit.

* * * * *